United States Patent
Siegel et al.

(10) Patent No.: US 8,131,647 B2
(45) Date of Patent: Mar. 6, 2012

(54) METHOD AND SYSTEM FOR PROVIDING ANNOTATIONS OF A DIGITAL WORK

(75) Inventors: Hilliard B Siegel, Seattle, WA (US); Udi Manber, Palo Alto, CA (US); Jonathan Leblang, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 1067 days.

(21) Appl. No.: 11/039,645

(22) Filed: Jan. 19, 2005

(65) Prior Publication Data

US 2006/0161578 A1    Jul. 20, 2006

(51) Int. Cl.
*G06F 21/00*    (2006.01)

(52) U.S. Cl. ............................ 705/57; 705/64

(58) Field of Classification Search .................... 705/57, 705/64
See application file for complete search history.

(56) References Cited

U.S. PATENT DOCUMENTS

| | | |
|---|---|---|
| 5,544,305 A | 8/1996 | Ohmaye et al. |
| 5,566,098 A | 10/1996 | Lucente |
| 5,663,748 A | 9/1997 | Huffman |
| 5,710,922 A | 1/1998 | Alley |
| 5,711,922 A | 1/1998 | O'Brien |
| 5,742,905 A | 4/1998 | Pepe |
| 5,761,485 A | 6/1998 | Munyan |
| 5,765,168 A | 6/1998 | Burrows |
| 5,847,698 A | 12/1998 | Reavey |
| 5,892,900 A | 4/1999 | Ginter |
| 5,956,048 A | 9/1999 | Gaston |
| 5,960,411 A | 9/1999 | Hartman |
| 6,037,954 A | 3/2000 | McMahon |
| 6,041,335 A | 3/2000 | Merritt |
| 6,047,189 A | 4/2000 | Yun |
| 6,049,796 A | 4/2000 | Siitonen |
| 6,154,757 A | 11/2000 | Krause et al. |
| 6,233,318 B1 | 5/2001 | Picard |
| 6,300,947 B1 | 10/2001 | Kanevsky |
| 6,313,828 B1 | 11/2001 | Chombo |

(Continued)

FOREIGN PATENT DOCUMENTS

WO    97/20274 A1    6/1997

(Continued)

OTHER PUBLICATIONS

Pattern-Based Annotations on E-Books: From Personal to shared Didactic Content, Cyrille Desmoulins, Dominique Mille Clips-Imag & Joseph Fourier University, Grenoble 2002.*

(Continued)

*Primary Examiner* — Pierre E Elisca

(57) ABSTRACT

Methods and systems for receiving and distributing annotations of a digital work include receiving an annotation of the digital work, storing the annotation, and providing the annotation to a user. The user may be required to submit a valid authorization credential for the annotation. Annotations may be textual or graphical, and may be associated with particular content in a digital work. Indicators may be displayed to identify content in the digital work for which annotations are available. A user may exchange compensation or perform a specified action for access to an annotation. Some or all of the compensation received for an annotation may be distributed to the author of the annotation. Multiple annotations may be listed in an order based a criterion, such as ranking, price, or date of receipt. Users that purchase a digital work may automatically receive an authorization credential to receive annotations of the digital work.

52 Claims, 9 Drawing Sheets

U.S. PATENT DOCUMENTS

| | | |
|---|---|---|
| 6,331,867 B1 | 12/2001 | Eberhard |
| 6,335,678 B1 | 1/2002 | Heutschi |
| 6,351,750 B1 | 2/2002 | Duga |
| 6,385,596 B1 | 5/2002 | Wiser |
| 6,401,086 B1 | 6/2002 | Bruckner |
| 6,442,651 B2 | 8/2002 | Crow et al. |
| 6,449,627 B1 | 9/2002 | Baer |
| 6,457,030 B1 | 9/2002 | Adams et al. |
| 6,493,734 B1 | 12/2002 | Sachs et al. |
| 6,529,920 B1 | 3/2003 | Arons |
| 6,658,623 B1 | 12/2003 | Schilit et al. |
| 6,685,482 B2 | 2/2004 | Hopp et al. |
| 6,687,878 B1 | 2/2004 | Eintracht et al. |
| 6,704,733 B2 | 3/2004 | Clark et al. |
| 6,721,869 B1 | 4/2004 | Senthil |
| 6,735,583 B1 | 5/2004 | Bjarnestam |
| 6,847,966 B1 | 1/2005 | Sommer |
| 6,904,449 B1 | 6/2005 | Quinones |
| 6,933,928 B1 | 8/2005 | Lilienthal |
| 6,938,076 B2 | 8/2005 | Meyer |
| 6,985,932 B1 | 1/2006 | Glaser |
| 6,999,565 B1 | 2/2006 | Delaney |
| 7,007,015 B1 | 2/2006 | Nayak |
| 7,009,596 B2 | 3/2006 | Seet |
| 7,020,654 B1 | 3/2006 | Najmi |
| 7,092,116 B2 | 8/2006 | Calaway |
| 7,103,848 B2 | 9/2006 | Barsness |
| 7,107,533 B2 | 9/2006 | Duncan |
| 7,149,776 B1 | 12/2006 | Roy et al. |
| 7,165,217 B1 | 1/2007 | Kondo |
| 7,209,888 B2 | 4/2007 | Frid-Nielsen |
| 7,237,123 B2 | 6/2007 | LeVine et al. |
| 7,246,118 B2 | 7/2007 | Chastain et al. |
| 7,249,060 B2 | 7/2007 | Ling |
| 7,249,324 B2 | 7/2007 | Nakamura et al. |
| 7,257,577 B2 | 8/2007 | Fagin |
| 7,287,068 B1 | 10/2007 | Eriksson |
| 7,290,285 B2 | 10/2007 | McCurdy et al. |
| 7,298,851 B1 | 11/2007 | Hendricks |
| 7,304,635 B2 | 12/2007 | Seet |
| 7,313,759 B2 | 12/2007 | Sinisi |
| 7,350,704 B2 | 4/2008 | Barsness |
| 7,355,591 B2 | 4/2008 | Sugimoto |
| 7,386,480 B2 | 6/2008 | Sarig |
| 7,401,286 B1 | 7/2008 | Hendricks |
| 7,533,152 B2 | 5/2009 | Stark |
| 7,562,032 B2 | 7/2009 | Abbosh |
| 7,574,653 B2 | 8/2009 | Croney et al. |
| 7,631,013 B2 | 12/2009 | Parsons et al. |
| 7,865,567 B1 | 1/2011 | Hendricks et al. |
| 2001/0007980 A1 | 7/2001 | Ishibashi |
| 2001/0025302 A1 | 9/2001 | Suzuki et al. |
| 2001/0027478 A1 | 10/2001 | Meier |
| 2001/0037328 A1 | 11/2001 | Pustejovsky |
| 2001/0049623 A1 | 12/2001 | Aggarwal |
| 2001/0053975 A1 | 12/2001 | Kurihara |
| 2002/0002540 A1 | 1/2002 | DeMello et al. |
| 2002/0010707 A1 | 1/2002 | Chang et al. |
| 2002/0010759 A1 | 1/2002 | Hitson |
| 2002/0012134 A1* | 1/2002 | Calaway ............ 358/1.18 |
| 2002/0035697 A1 | 3/2002 | McCurdy |
| 2002/0054059 A1 | 5/2002 | Schneiderman |
| 2002/0069312 A1 | 6/2002 | Jones |
| 2002/0092031 A1 | 7/2002 | Dudkiewicz |
| 2002/0101447 A1 | 8/2002 | Carro |
| 2002/0103809 A1 | 8/2002 | Starzl |
| 2002/0120635 A1 | 8/2002 | Joao |
| 2002/0129012 A1 | 9/2002 | Green |
| 2002/0138291 A1 | 9/2002 | Vaidyanathan |
| 2002/0143822 A1 | 10/2002 | Brid et al. |
| 2002/0147724 A1 | 10/2002 | Fries |
| 2002/0184319 A1 | 12/2002 | Willner |
| 2003/0009459 A1 | 1/2003 | Chastain et al. |
| 2003/0018720 A1 | 1/2003 | Chang |
| 2003/0025731 A1 | 2/2003 | Chastain et al. |
| 2003/0028395 A1 | 2/2003 | Rodgers |
| 2003/0040970 A1 | 2/2003 | Miller |
| 2003/0046233 A1 | 3/2003 | Ara |
| 2003/0058265 A1 | 3/2003 | Robinson |
| 2003/0065642 A1* | 4/2003 | Zee .................... 707/1 |
| 2003/0069812 A1 | 4/2003 | Yuen |
| 2003/0093382 A1 | 5/2003 | Himeno et al. |
| 2003/0097354 A1 | 5/2003 | Finlay |
| 2003/0110503 A1 | 6/2003 | Perkes |
| 2003/0135495 A1 | 7/2003 | Vagnozzi |
| 2003/0163399 A1 | 8/2003 | Harper |
| 2003/0164844 A1 | 9/2003 | Kravitz |
| 2003/0182551 A1 | 9/2003 | Frantz |
| 2003/0190145 A1 | 10/2003 | Copperman |
| 2003/0212613 A1 | 11/2003 | Sarig |
| 2004/0002943 A1 | 1/2004 | Merrill et al. |
| 2004/0003398 A1 | 1/2004 | Donian |
| 2004/0044723 A1 | 3/2004 | Bell |
| 2004/0117189 A1 | 6/2004 | Bennett |
| 2004/0139400 A1 | 7/2004 | Allam |
| 2004/0201633 A1 | 10/2004 | Barsness |
| 2004/0205457 A1 | 10/2004 | Bent |
| 2004/0237033 A1 | 11/2004 | Woolf |
| 2004/0267552 A1 | 12/2004 | Gilliam |
| 2004/0268253 A1 | 12/2004 | DeMello |
| 2005/0022113 A1 | 1/2005 | Hanlon |
| 2005/0044148 A1 | 2/2005 | Son |
| 2005/0044224 A1* | 2/2005 | Jun et al. ............ 709/225 |
| 2005/0069225 A1* | 3/2005 | Schneider et al. ........ 382/305 |
| 2005/0102618 A1 | 5/2005 | Naito |
| 2005/0176438 A1 | 8/2005 | Li |
| 2005/0193330 A1* | 9/2005 | Peters ............ 715/513 |
| 2005/0198070 A1 | 9/2005 | Lowry |
| 2005/0222977 A1 | 10/2005 | Zhou |
| 2005/0256822 A1 | 11/2005 | Hollingsworth |
| 2006/0004840 A1 | 1/2006 | Senda |
| 2006/0020469 A1 | 1/2006 | Rast |
| 2006/0061595 A1* | 3/2006 | Goede et al. ........... 345/619 |
| 2006/0071754 A1 | 4/2006 | Tofts |
| 2006/0075205 A1* | 4/2006 | Martin et al. ........... 711/200 |
| 2006/0098900 A1 | 5/2006 | King |
| 2006/0123053 A1 | 6/2006 | Scannell |
| 2006/0129618 A1 | 6/2006 | Maier |
| 2006/0143558 A1* | 6/2006 | Albornoz et al. .......... 715/512 |
| 2006/0156222 A1 | 7/2006 | Chi et al. |
| 2006/0161635 A1 | 7/2006 | Lamkin |
| 2006/0179137 A1 | 8/2006 | Jennings |
| 2006/0190489 A1 | 8/2006 | Vohariwatt et al. |
| 2006/0190568 A1 | 8/2006 | Patterson |
| 2006/0236240 A1 | 10/2006 | Lebow |
| 2006/0253461 A1 | 11/2006 | de Bonet |
| 2006/0256083 A1 | 11/2006 | Rosenberg |
| 2006/0281058 A1 | 12/2006 | Mangoaela |
| 2007/0014404 A1 | 1/2007 | Cha |
| 2007/0050346 A1 | 3/2007 | Goel |
| 2007/0061335 A1 | 3/2007 | Ramer |
| 2007/0073596 A1 | 3/2007 | Alexander et al. |
| 2007/0094351 A1 | 4/2007 | Kalish et al. |
| 2007/0118533 A1 | 5/2007 | Ramer |
| 2007/0150456 A1 | 6/2007 | Lian et al. |
| 2007/0174545 A1 | 7/2007 | Okada |
| 2007/0219983 A1 | 9/2007 | Fish |
| 2007/0234209 A1 | 10/2007 | Williams |
| 2007/0240187 A1 | 10/2007 | Beach |
| 2007/0282809 A1 | 12/2007 | Hoeber |
| 2008/0005097 A1 | 1/2008 | Kleewein |
| 2008/0005664 A1 | 1/2008 | Chandra |
| 2008/0027933 A1 | 1/2008 | Hussam |
| 2008/0082518 A1 | 4/2008 | Loftesness |
| 2008/0082911 A1 | 4/2008 | Sorotokin |
| 2008/0133479 A1 | 6/2008 | Zelevinsky |
| 2008/0163039 A1 | 7/2008 | Ryan |
| 2008/0208833 A1 | 8/2008 | Basmov |
| 2008/0222552 A1 | 9/2008 | Batarseh et al. |
| 2008/0243788 A1 | 10/2008 | Reztlaff, II |
| 2008/0243828 A1 | 10/2008 | Reztlaff, II |
| 2008/0293450 A1 | 11/2008 | Ryan |
| 2008/0294674 A1 | 11/2008 | Reztlaff, II |
| 2008/0295039 A1 | 11/2008 | Nguyen |
| 2009/0094528 A1 | 4/2009 | Gray et al. |
| 2009/0094540 A1 | 4/2009 | Gray et al. |

| | | | |
|---|---|---|---|
| 2009/0228774 | A1 | 9/2009 | Matheny et al. |
| 2010/0023259 | A1 | 1/2010 | Krumm et al. |
| 2010/0081120 | A1 | 4/2010 | Nanjiani et al. |

FOREIGN PATENT DOCUMENTS

| | | |
|---|---|---|
| WO | 00/45588 A1 | 8/2000 |
| WO | 00/56055 A2 | 9/2000 |
| WO | 00/75840 A2 | 12/2000 |
| WO | 02/39206 A2 | 5/2002 |
| WO | 2004/055647 A2 | 7/2004 |

OTHER PUBLICATIONS

"Annotation Engine," Berkman Center for Internet & Society at Harvard Law School <http://cyber.law.harvard.edu/projects/annotate.html> [Retrieved Jan. 30, 2004].

"Annoatator Instructions," Berkman Center for Internet & Society at Harvard Law School <http://cyber.law.harvard.edu/annotate/instructions.html> [Retrieved Jan. 30, 2004].

"Annotator Wishlist," Berkman Center for Internet & Society at Harvard Law School <http://cyber.law.harvard.edu/cite/annotate.cgi?action=print&markup;center=;view=http%3A%2F%2Fcy...> [Retrieved Jan. 30, 2004].

"Say No to Third Voice," Worldzone.net, © 1999-2004, <http://worldzone.net/internet/pixelsnttv/index.html> [retrieved Jan. 30, 2004].

"The Berkman Center for Internet & Society at Harvard Law School: Annotation Engine," Harvard.Edu, © 1999-2004, <http://cyber.law.harvard.edu/projects/annotate.html> [Retrieved Jan. 30, 2004].

Carter, S., et al., "Digital Graffiti: Public Annotation of Multimedia Content," *Proceedings of the CHI 2004*, Vienna, Austria, Apr. 24-29, 2004, pp. 1207-1210.

Kumar, A., "Third Voice Trails off . . . ," *Wired News*, © 2004, <http://www.wired.com/news/print/0,1294,42803,00.html> [retrieved Jan. 30, 2004].

Marshall, C.C., "The Future of Annotation in a Digital (Paper) World," *Proceedings of the 35th Annual GSLIS Clinic*, University of Illinois at Urbana-Champaign, Urbana, Il, Mar. 22-24, 1998, pp. 1-19.

Röscheisen, M., et al., "Beyond Browsing: Shared Comments, SOAPs, Trails, and On-Line Communities," *Computer Networks and ISDN Systems* 27:739-749, 1995.

Extended European Search Report mailed Dec. 22, 2009, issued in corresponding European Patent Application No. EP 06 71 8773.2, filed Jan. 18, 2006.

Bradley, D., "Plastic Shape Shifter," Reactive Reports: Chemistry Web Magazine, Issue 61, Dec. 2006, <http://www.reactivereports.com/61/61_3.html> [retrieved Jun. 7, 2010], 2 pages.

"Cafesoft: Security Glossary," Oct. 13, 2003, <http://www.cafesoft.com/support/security-glossary.html> [retrieved Jul. 2, 2009], 6 pages.

Cavanaugh, T., "EBooks and Accommodations: Is This the Future of Print Accommodation?" Teaching Exceptional Children 35(2):56-61, Nov./Dec. 2002.

Chi, E.H., et al., "eBooks With Indexes That Reorganize Conceptually," Proceedings of Conference on Human Factors in Computing Systems [CHI '04], Vienna, Apr. 24-29, 2004, pp. 1223-1226.

Cleveland, Jr., R.F., et al., "Evaluating Compliance With FCC Guidelines for Human Exposure to Radiofrequency Electromagnetic Fields," OET Bulletin 65 (Edition 97-01), Aug. 1997, 84 pages.

Cleveland, Jr., R.F., and J.L. Ulcek., "Questions and Answers About Biological Effects and Potential Hazards of Radiofrequency Electromagnetic Fields," OET Bulletin 56, 4th ed., Aug. 1999, 38 pages.

Davison, G., et al., "The Use of eBooks and Interactive Multimedia, as Alternative Forms of Technical Documentation," Proceedings of the 23rd Annual Int'l Conference on Design of Communication: Documenting & Designing for Pervasive Information [SIGDOC '05], Coventry, U.K., Sep. 21-23, 2005, pp. 108-115.

Elspass, W.J., and A.M. Kunz, "Portable Haptic Interface With Active Functional Design," Proceedings of SPIE Conference on Smart Structures and Integrated Systems, Newport Beach, Calif., Mar. 1999, vol. 3668, pp. 926-932.

"Haptic History—Machine Haptics (Expansion)" <<http://hapticshistory.chc61.uci.cu/haptic/site/pages/Machine-Haptics-Became_5.php>> from Google's cache, text-only version as Web page appeared Apr. 16, 2009 [retrieved May 7, 2009], 8 pages.

Jones, L.A., et al., "Development of a Tactile Vest," Proceedings of the 12th Int'l Symposium on Haptic Interfaces for Virtual Environment and Teleoperator System [HAPTICS '04], Chicago, Mar. 27-28, 2004, pp. 82-89.

Leutwyler, K., "Shape-Shifting Polymer Gels," Scientific American, Nov. 9, 2000, <http://www.scientificamerican.com/article.cfm?id=shape-shifting-polymer-ge&print=true> [retrieved May 7, 2009], 1 page.

Means, D.L, and K.W. Chan, "Evaluating Compliance With FCC Guidelines for Human Exposure to Radiofrequency Electromagnetic Fields: Additional Information for Evaluating Compliance of Mobile and Portable Devices With FCC Limits for Human Exposure to Radiofrequency Emissions," Supplement C (Edition 01-01) to OET Bulletin 65 (Edition 97-01), Jun. 2001, 57 pages.

Nakatani, M., et al., "3D Form Display With Shape Memory Alloy," Proceedings of the 13th Int'l Conference on Artificial Reality and Telexistence [ICAT], Tokyo, Dec. 3-5, 2003, pp. 179-184.

Oqo, "A Full PC That Fits in Your Pocket," n.d., <http://www.oqo.com/support/documentation.html> retrieved Sep. 22, 2008, 34 pages.

"Shape Memory Polymer," Wikipedia, <http://en/wikipedia.org/wiki/Shape_memory_polymer> [retrieved May 7, 2009], 8 pages.

Sohn, W.-S., et al., "Development of a Standard Format for eBooks," Proceedings of the ACM Symposium on Applied Computing [SAC 2002], Madrid, Mar. 11-14, 2000, pp. 535-540.

Wellman, P.S., et al. "Mechanical Design and Control of a High-Bandwidth Shape Memory Alloy Tactile Display," Proceedings of the Int'l Symposium on Experimental Robotics, Barcelona, Jun. 1997, pp. 56-66.

Yoshikawa, W., et al., "Vertical Drive Micro Actuator for Haptic Display Using Shape Memory Alloy Thin Film," Papers of Technical Meeting on Micromachine and Sensor System MSS-05(21-44):103-108, 2005.

International Search Report mailed Jul. 7, 2008, in International Application No. PCT/US08/57848, filed Mar. 31, 2008, 2 pages.

International Search Report mailed Aug. 15, 2008, in International Application No. PCT/US07/89105, filed Dec. 28, 2007, 2 pages.

International Search Report mailed Aug. 15, 2008, in corresponding International Application No. PCT/US08/57829, filed Mar. 21, 2008, 1 page.

International Search Report mailed Sep. 9, 2008, in International Application No. PCT/US08/64387, filed May 21, 2008, 1 page.

International Search Report and Written Opinion mailed Mar. 8, 2010, in International Application No. PCT/US10/22060, filed, Jan. 26, 2010, 7 pages.

Agarwal, A., et al., "Questions on Highlighted Passages," U.S. Appl. No. 12/414,914, filed Mar. 31, 2009.

Bajaj, G.B., et al., "Providing User-Supplied Items to a User Device," U.S. Appl. No. 11/763,390, filed Jun. 14, 2007.

Dimson, T., et al., "Aggregation of Highlights," U.S. Appl. No. 12/360,089, filed Jan. 26, 2009.

Dixon, S., et al., "Bundled Digital Content," U.S. Appl. No. 12/366,941, filed Feb. 6, 2009.

Green, C., "User Interface Cluster," U.S. Appl. No. 29/331,528, filed Jan. 27, 2009.

Isbister, D., et al., "Power Management Techniques for a User Device," U.S. Appl. No. 11/763,339, filed Jun. 14, 2007.

Johnston, J., et al., "Antenna Placement on Portable Device," U.S. Appl. No. 12/351,629, filed Jan. 9, 2009.

Kiraly, K., et al., "Notification of a User Device to Perform an Action," U.S. Appl. No. 11/763,376, filed Jun. 14, 2007.

Lattyak, J., et al., "Acquisition of an Item Based on a Catalog Presentation of Items," U.S. Appl. No. 11/537,518, filed Sep. 29, 2006.

Lattyak, J., et al., "Relative Progress and Event Indicators," U.S. Appl. No. 11/693,685, filed Mar. 29, 2007.

Lattyak, J., et al., "Display Dependent Markup Language," U.S. Appl. No. 11/763,314, filed Jun. 14, 2007.

Lattyak, J., et al., "Delivery of Items for Consumption by a User Device," U.S. Appl. No. 11/763,375, filed Jun. 14, 2007.

Lattyak, J., et al., "Transfer of Instructions to a User Device," U.S. Appl. No. 11/763,378, filed Jun. 14, 2007.

Lattyak, J., et al., "Incremental Updates of Items," U.S. Appl. No. 11/763,393, filed Jun. 14, 2007.
Li, C., et al., "Surface Mount Clip for Routing and Grounding Cables," U.S. Appl. No. 12/351,663, filed Jan. 9, 2009.
Parekh, J.P., et al., "Reader Device Content Indexing," U.S. Appl. No. 11/277,894, filed Mar. 29, 2006.
Retzlaff II, J., et al., "Obtaining and Verifying Search Indices," U.S. Appl. No. 11/763,357, filed Jun. 14, 2007.
Retzlaff II, J., et al., "Search Results Generation and Sorting," U.S. Appl. No. 11/763,363, filed Jun. 14, 2007.
Ryan, T., "Expedited Acquisition of a Digital Item Following a Sample Presentation of the Item," U.S. Appl. No. 11/537,484, filed Sep. 29, 2006.
Ryan, T., et al., "Handling of Subscription-Related Issues in a Media Consumption System," U.S. Appl. No. 11/763,386, filed Jun. 14, 2007.
Ryan, T., et al., "Administrative Tasks in a Media Consumption System," U.S. Appl. No. 11/763,392, filed Jun. 14, 2007.
Ryan, T., et al., "Providing Supplemental Information Based on Hints in a Media Consumption System," U.S. Appl. No. 11/763,395, filed Jun. 14, 2007.
Rykov, M., et al., "Selecting and Providing Items in a Media Consumption System," U.S. Appl. No. 11/763,381, filed Jun. 14, 2007.
Rykov, M., et al., "Dissemination of Periodical Samples," U.S. Appl. No. 11/963,618, filed Dec. 21, 2007.
Zagorie, A., et al., "Device-Specific Presentation Control for Electronic Book Reader Devices," U.S. Appl. No. 12/333,215, filed Dec. 11, 2008.
European Office Action mailed Mar. 26, 2010 for European Patent Application No. 06718773.2, a counterpart foreign application of U.S. Appl. No. 11/039,645, 1 page.
Non-Final Office Action for U.S. Appl. No. 11/537,518, mailed on Apr. 28, 2011, John Lattyak, "Acquisition of an Item Based on a Catalog Presentation of Items," 8 pages.
Office action for U.S. Appl. No. 11/763,357, mailed on May 26, 2011, Reztlaff, "Obtaining and Verifying Search Indices," 13 pages.
Final Office Action for U.S. Appl. No. 11/763,314, mailed on Jun. 13, 2011, Craig S. Griffin, "Display Dependent Markup Language," 26 pages.
Non-Final Office Action for U.S. Appl. No. 11/693,682, mailed on Jun. 9, 2011, Hilliard B. Siegel, "Providing Annotations of a Digital Work," 12 pages.
Cavanaugh, "EBooks and Accommodations," Teaching Exceptional Children, vol. 35, No. 2, Copyright 2002 CEC, 6 pages.
Office action for U.S. Appl. No. 12/333,215, mailed on Jul. 18, 2011, Zagorie et al., "Device-Specific Presentation Control for Electronic Book Reader Devices," 22 pages.
Non-Final Office Action for U.S. Appl. No. 11/693,685, mailed Jul. 6, 2011, John Lattyak, "Relative Progress and Event Indicators," 22 pages.
Office action for U.S. Appl. No. 12/414,914, mailed on Aug. 4, 2011, Agarwal et al., "Questions on Highlighted Passages," 39 pages.
BarnesandNoble.com, "Barnes and Noble Homepage," retrieved on Aug. 2, 2011 and <<http://web.archive.org/web/19981202183957/http://www.barnesandnoble.com/>>, Dec. 2, 1998.
Translated copy of the Chinese Office Action mailed Jul. 14, 2011 for Japanese patent application No. 20078004873.9, a counterpart foreign application of US patent No. 7,865,817, 6 pages.
Non-final Office Action for U.S. Appl. No. 11/537,484, mailed on Aug. 19, 2011, Thomas A. Ryan, "Expedited Acquisition of a Digital Item Following Sample Presentation of the Item," 13 pages.
Non-final Office Action for U.S. Appl. No. 11/763,363, mailed on Aug. 26, 2011, James R. Retzlaff II, "Search Results Generation and Sorting," 10 pages.
Non-Final Office Action for U.S. Appl. No. 11/763,358, mailed on Sep. 12, 2011, James R. Retzlaff II, "Managing Status of Search Index Generation," 11 pages.
Translated copy of Chinese Office Action mailed Aug. 25, 2011 for Chinese patent application No. 200880024964.2, a counterpart foreign application of U.S. Appl. No. 11/763,358, 6 pages.
Office action for U.S. Appl. No. 12/360,089, mailed on Oct. 5, 2011, Killalea et al., "Aggregation of Highlights," 75 pages.
Final Office Action for U.S. Appl. No. 11/762,392, mailed on Oct. 14, 2011, Thomas Ryan, "Administrative Tasks in a Media Consumption System," 38 pages.
Final Office Action for U.S. Appl. No. 11/963,618, mailed on Sep. 26, 2011, Michael Rykov, "Dissemination of Periodical Samples," 15 pages.
Non-Final Office Action for U.S. Appl. No. 11/763,374, mailed on Sep. 27, 2011, Thomas Ryan, "Consumption of Items via a User Device," 17 pages.

* cited by examiner

METHOD AND SYSTEM FOR PROVIDING ANNOTATIONS OF A DIGITAL WORK

FIELD OF THE INVENTION

The present invention relates to distribution of digital works, and more particularly to creating a market for distribution of annotations of digital works.

BACKGROUND OF THE INVENTION

For many years, print media provided the only way to transmit information and ideas in a fixed form. With the advent of photography and audio recording, additional media have become available for transmitting information and ideas. The information in such media, however, is static. Updated information is provided only by preparing and distributing additional media. However, widespread distribution of updated information, including comments, supplements, features, thoughts, insights, etc., becomes difficult when the information is authored by multiple parties. Media consumers having additional information or insight typically do not have a way to effectively share that information with other consumers. What is needed is a method and system that allows users of media to easily annotate the media and afterward distribute such annotations to others in an economical and efficient manner. The present invention addresses this need and other shortcomings in the prior art.

BRIEF SUMMARY

In one aspect, a method and system for receiving and distributing annotations of a digital work includes identifying a digital work and receiving an annotation of the digital work. The annotation may be stored in a database in association with the digital work. A user desiring to access the annotation submits an authorization credential that, if valid, enables the user to receive the annotation of the digital work. The annotation may be presented to the user in context with regard to the digital work.

In some embodiments, a digital work may be annotated with textual or graphical annotations. Examples of graphical annotations include handwritten text and pictures, as well as typed text, clips from other works, images, etc. Annotations may also include, for example, highlighting of text in a digital work. If desired, an annotation may be associated with particular content in a digital work.

An annotation delivered to a user may be viewable concurrent with a display of the digital work with which the annotation is associated. In some embodiments, annotations may be normally hidden and become viewable when a user positions a cursor or pointer near particular content in the digital work to which the annotations pertain. Indicators may be displayed with the digital work to identify content in the digital work for which annotations are available. If the digital work is an audio or audiovisual work, indicators identifying annotations may be displayed with a playback control provided for playback of the digital work. In yet other embodiments, the availability of annotations for a digital work may be identified by indicators in a listing of contents for the digital work.

In another aspect, a user may obtain an authorization credential for an annotation in exchange for compensation. The user may then submit the authorization credential to obtain the desired annotation. In some circumstances, the authorization credential may represent compensation from the user. Where monetary compensation is received for an annotation, some or all of the compensation may be distributed to the author of the annotation. An indication of satisfaction from the user to whom the annotation is provided may be required before the compensation is distributed to the author. A user may submit an authorization credential that is specific to an annotation and have it considered as a request for the particular annotation.

When multiple annotations are associated with particular content in a digital work, a user desiring annotations may be provided with a list that presents the multiple annotations in an order determined by reference to a criterion. In some embodiments, the criterion may be a ranking of the annotations assigned by others who have previously viewed the annotations. In other embodiments, the criterion may be a price assigned to each of the annotations. In yet other embodiments, the criterion may be a date of receipt of each of the annotations.

In another aspect, users that purchase a digital work may automatically be given an authorization credential that enables them to receive annotations of the digital work. Such annotations, when combined with the digital work to which they pertain, may be configured to become accessible to the user upon accessing the digital work.

In another aspect, a user may be given an authorization credential in exchange for performance of a specified action. For example, an authorization credential may be given to a user as a reward for electronically previewing a digital work or contributing an annotation of a digital work.

Embodiments of the invention may also enable multiple parties to be authorized distributors of credentials for access to annotations. Members of a family, a group of students in a class, or participants in a book club, for example, may annotate a digital work and share their annotations with the others in their family or group by distributing appropriate authorization credentials among the family or group.

Computer systems may be configured to provide features and aspects of the present invention. For example, a server system may be configured to interact with a client system to receive and provide annotations of a digital work. The server system may comprise, for example, an interface for communicating with one or more client systems, a memory, and a processor for executing program instructions stored in the memory. The server system may receive from a client system an annotation of the digital work. If desired, the annotation may be associated with particular content in the digital work. The server system may store the annotation in the memory and upon receipt of a valid authorization credential from a client system, the server system may provide the annotation to the client system, possibly with an indication of the particular content in the digital work to which the annotation pertains.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
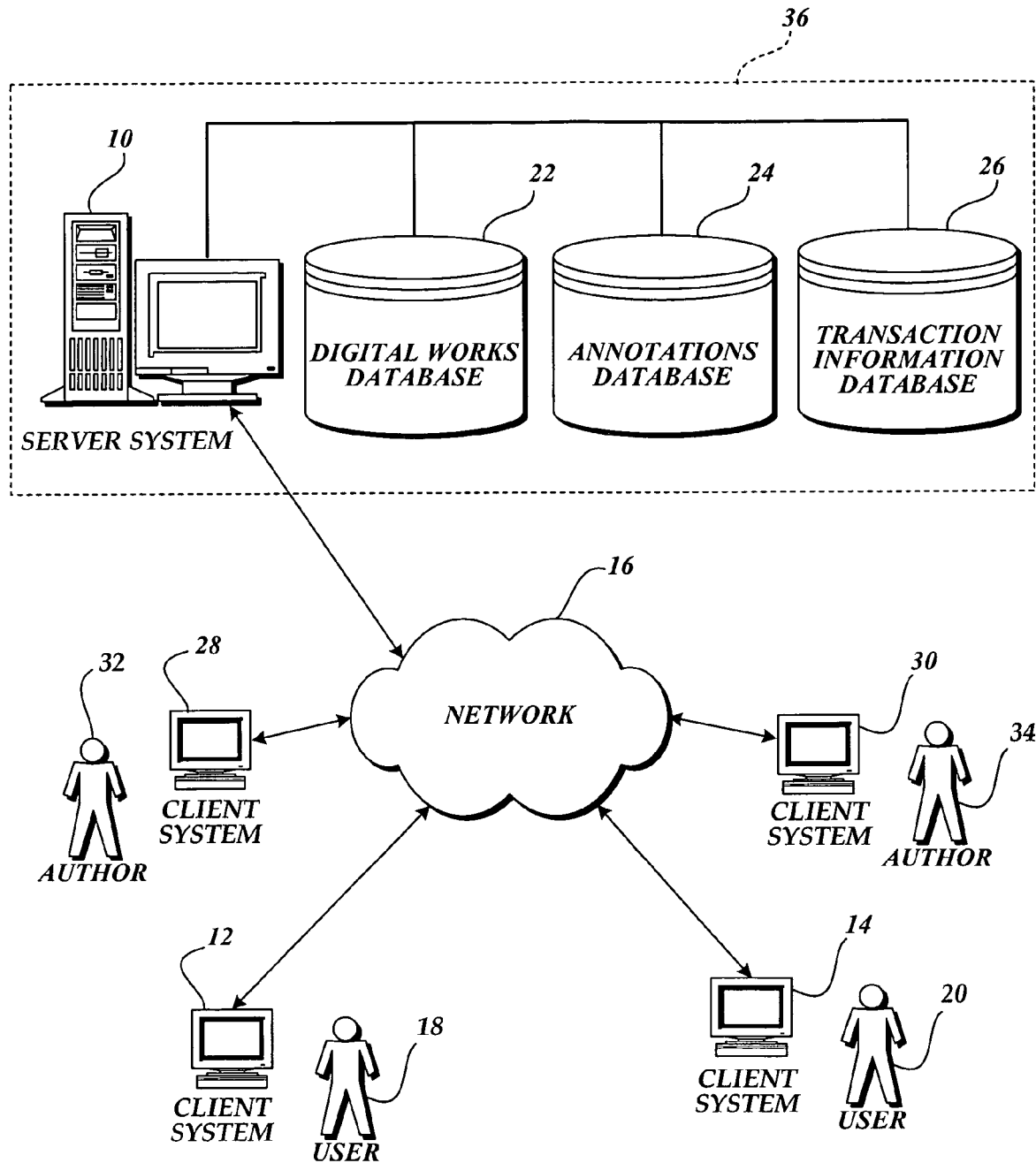
FIG. 1 is a pictorial diagram of a computing environment that includes a server system and a number of client systems communicatively connected via a network.

FIG. 1 provides an exemplary overview of one computing environment in which embodiments of the invention may be implemented. The depicted environment includes a server system 10 and one or more client systems 12, 14 communicatively connected by a network 16. The client system 12 is shown associated with a user 18, and the client system 14 is shown associated with a user 20.

Also depicted in FIG. 1 are client systems 28, 30 communicatively connected to the server system 10 via the network 16. The client system 28 is shown associated with an author 32, and the client system 30 is shown associated with an author 34.

The terms "user", "author" and "source" are generally used herein. A "user" typically refers to a person, entity or device that seeks to receive an annotation previously stored in association with a digital work. An "author" typically refers to a person, entity or device that prepares an annotation for storage and distribution to users. A "source" typically refers to a person, entity, or device that originates a digital work that may be annotated by an "author". As should be readily appreciated, a person, entity or device can be a source, an author and/or a user, depending on the distribution of a digital work and whether an annotation is being prepared or requested. Accordingly, at different times, the users 18, 20 can be "authors" and the authors 32, 34 can be "users", and any of them (or some other third party) may be the source of a digital work.

As will be described with regard to the particular embodiments shown herein, the server system 10 is configured to exchange data and information, including digital works and annotations thereof, with the users 18, 20 who are operating the client systems 12, 14 and the authors 32, 34 who are operating the client systems 28, 30. In some circumstances, the server system 10 may be associated with a merchant, such as an online retailer authorized to provide a marketplace for selling and distributing digital works to consumers. Digital works, in the context of this description, may include any type of content that can be stored and distributed in digital form. By way of illustration, without limitation, digital works can include all forms of textual information such as books, magazines, newspapers, newsletters, manuals, guides, references, photographs, articles, reports, documents, etc., and all forms of audio and audiovisual works such as music, multimedia presentations, audio books, movies, etc.

Digital works may be stored as media files in a digital works database 22 that resides in or is otherwise communicatively connected to the server system 10. An annotations database 24 and a transaction information database 26 are also shown in FIG. 1 residing in or otherwise communicatively connected to the server system 10 and will be described in greater detail below. The server system 10, separately or together with the databases 22, 24, 26, may provide an online marketplace 36 that can receive and distribute annotations as well as the digital works to which the annotations pertain.

The network 16 shown in FIG. 1 may be a local area network (LAN) or a larger network, such as a wide area network (WAN), collection of networks, or the Internet. Protocols for network communication, such as TCP/IP, are well known to those skilled in the art of computer networks. An author, such as author 32, may operate a client system, such as client system 28, to request a digital work from the server system 10 via the network 16. The author 32 may also communicate annotations of a digital work to the server system 10 for storage in the annotations database 24 and distribution to others, such as the user 20. The user 20 may operate the client system 14 to request digital works and/or annotations thereof from the server system 10. As will be appreciated by those skilled in the art and others, FIG. 1 provides a simplified example of one suitable computing environment for implementing embodiments of the present invention, and the invention is not limited thereto.

When software formed in accordance with the invention is implemented in one or more computer systems, for example, of the type illustrated in FIG. 1, the computer systems provide a way for authors and users to access digital works, provide annotations thereto, and receive annotations of digital works. Providing a mechanism for annotation of a digital work and providing a mechanism for distribution of the annotation makes the underlying digital work more useful and valuable by providing improved or clarifying material in the digital work, updating material, correcting material, adding academic interest or "color" to the material, providing editorial comments to the material, etc. Embodiments of the invention may be implemented such that authors of annotations may receive some or all of compensation paid by other users to access the annotations.

Figure 2:
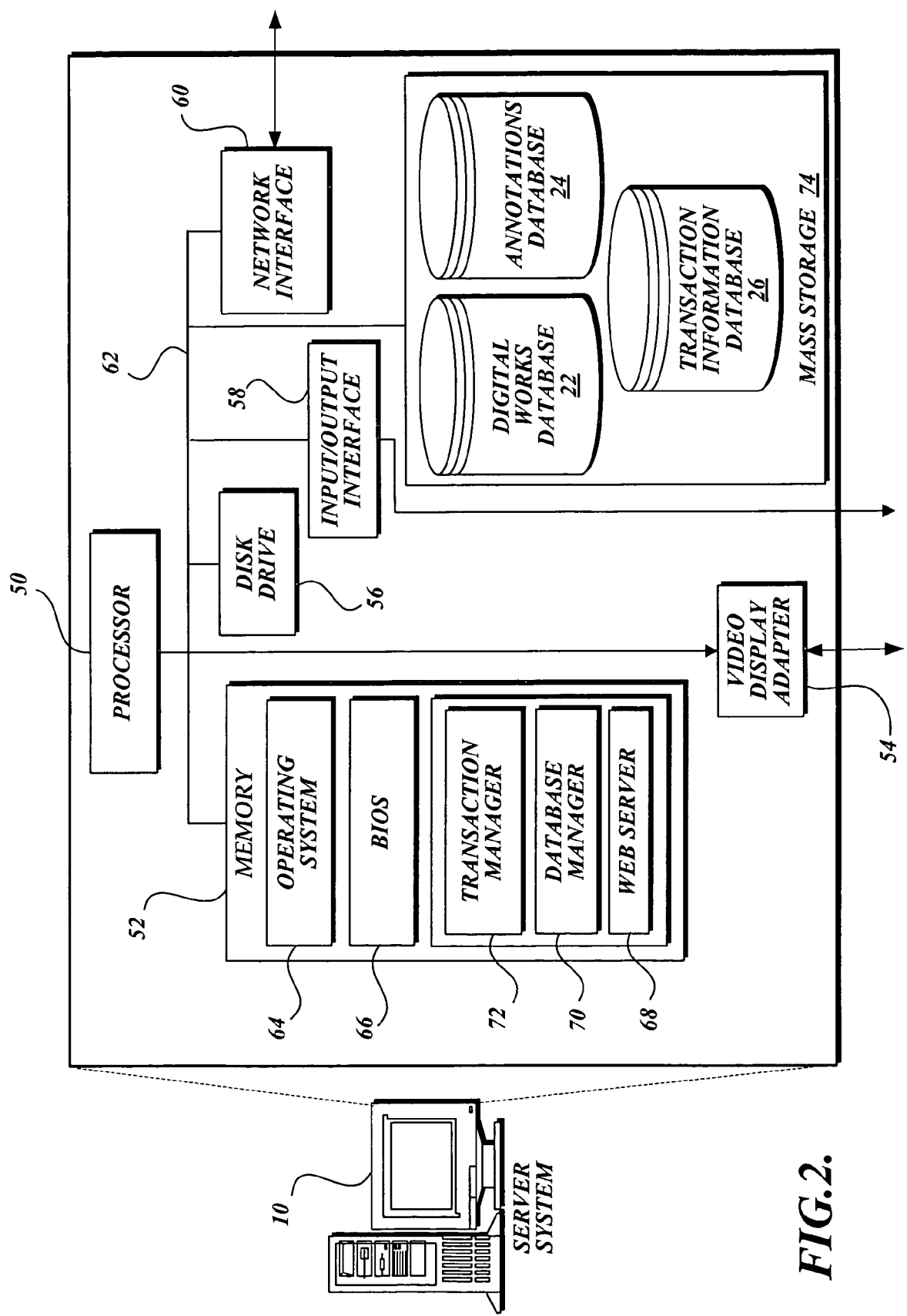
FIG. 2 is a schematic block diagram of an exemplary embodiment of a server system that may be used in the computing environment of FIG. 1.

FIG. 2 depicts an exemplary computer architecture for a server system, such as the server system 10, that may be used to implement embodiments of the invention discussed herein. Of course, persons skilled in computers will appreciate that other server systems suitable for use may include more or fewer components than those shown in FIG. 2.

The server system 10 shown in FIG. 2 is connected to the network 16 (FIG. 1) using a network interface 60. The network interface 60 includes hardware and software that allows the server system 10 to communicate with other computing devices connected to the network 16 by use of one or more suitable communication protocols, such as TCP/IP.

The server system 10 shown in FIG. 2 further includes a processor 50, a memory 52, a video display adapter 54, a disk drive 56, and an input/output interface 58, all of which are communicatively connected together and to the network interface 60 by a communication bus 62. The memory 52 generally comprises RAM, ROM, and/or other volatile or permanent memory. The memory 52 is shown storing an operating system 64 for controlling the operation of the server system 10. A binary input/output system (BIOS) 66 for controlling the low-level operation of the server system 10 is also stored in the memory 52.

The memory 52 additionally stores program code and data for providing network services that allow client systems to exchange information and data files with the server system 10. Accordingly, the memory 52 may store a Web server application 68, which may be provided by any one of a number of commercially available software packages. The Web server application 68 comprises computer executable instructions, that, when executed by the processor 50, generate or otherwise obtain configurable markup documents such as the sample Web pages shown in FIGS. 5-9, for display on client systems. The Web server application 68 communicates with a database manager application 70 and a transaction manager application 72 that facilitate additional functions of the server system 10 described below.

The video display adapter 54 provides display signals to a local display (not shown in FIG. 2) permitting an operator of the server system 10 to monitor and configure the operation of the server system. The input/output interface 58 likewise communicates with external devices not shown in FIG. 2, such as a mouse, keyboard, scanner, or other input and output devices that can be operated by an operator of the server system 10.

Further included in the server system 10 is a mass storage 74 comprising facilities such as one or more CD-RW/DVD-RW drives, hard disk drives, tape drives, etc., or combinations thereof, that are utilized to store digital content and information, such as annotations. In the embodiment shown in FIGS. 1 and 2, the mass storage 74 contains the digital works database 22, annotations database 24, and transaction information database 26.

Turning back to FIG. 1, the client systems 12, 14 and 28, 30 may take the form of any one of a number of different computer products and may include aspects of the computer architecture illustrated in FIG. 2, where appropriate. For example, the client systems 12, 14 and 28, 30 can include a network interface that enables communication with other computing devices such as the server system 10 via the network 16. Wired or wireless network connections may be used with any suitable communication protocol, such as TCP/IP. In general, the client systems 12, 14 and 28, 30 typically include a processor, a display, and a memory that stores program code and data for operating the client systems. The memory of the client systems 12, 14 and 28, 30 may also store an application for browsing Web pages, such as the Web pages shown in FIGS. 5-9.

The above-described computer systems may store software instructions that, when executed, implement aspects and features of the present invention. For example, such software can be stored on a computer-accessible medium (e.g., magnetic or optical disk or other device), or downloaded from a remote source, for loading into memory 52 to be executed by the processor 50. For illustrative purposes, described herein are embodiments of the invention that allow authors and users to access digital works, to receive annotations of those digital works from authors and to provide annotations of digital works to users, typically in exchange for some form of compensation or completed action by the user. Although the illustrative examples described herein depict a Web-based implementation, those of ordinary skill in the art will appreciate that other embodiments of the invention may use other implementations for communication and display of information to authors and users.

Figure 3:
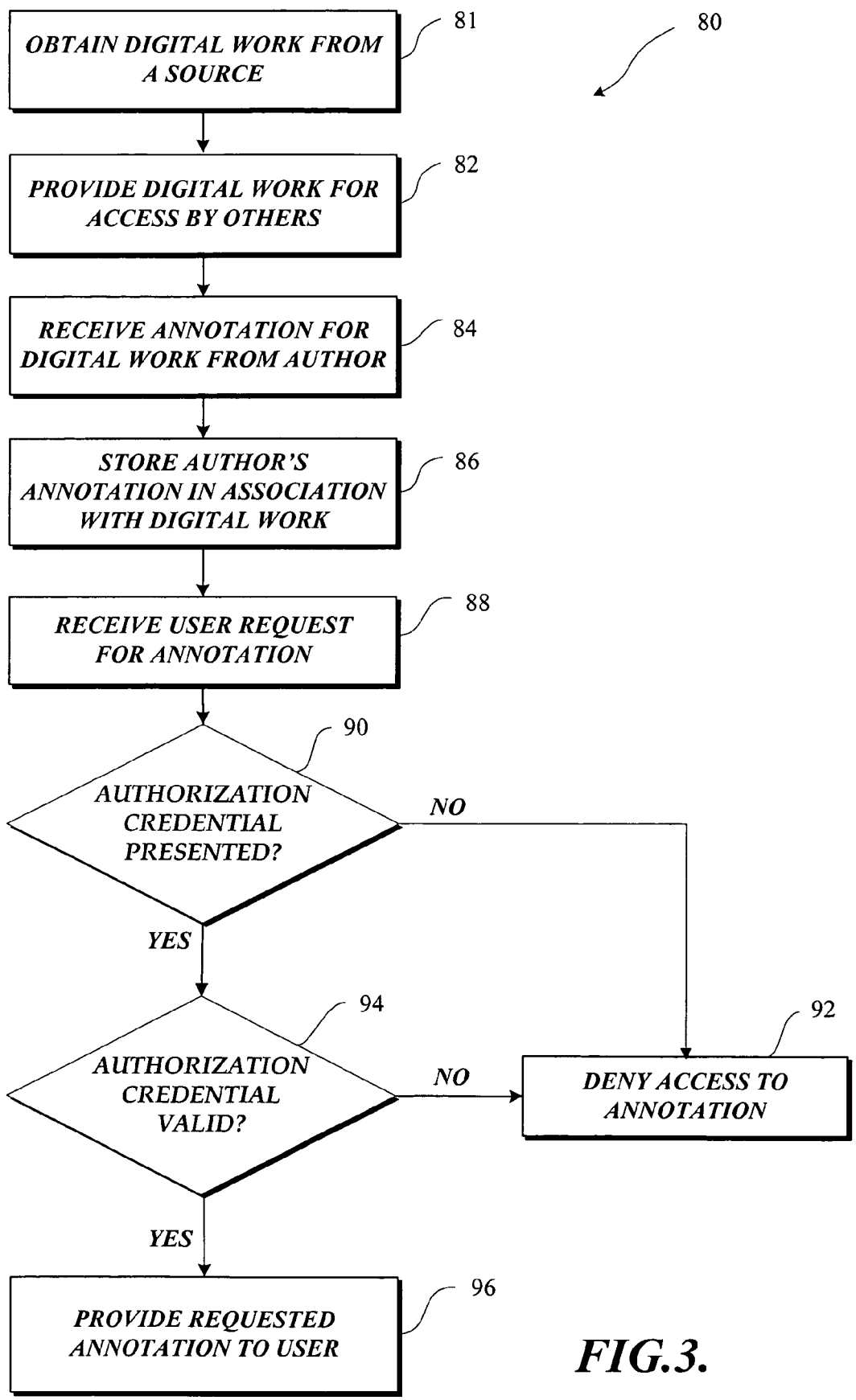
FIG. 3 is a flow diagram of a method of the present invention for receipt and distribution of annotations.

FIG. 3 is flow diagram of one exemplary method 80 for receiving and providing an annotation of a digital work. In this particular embodiment, the method 80 begins at optional block 81 in which a digital work is obtained from a source, including but not limited to a publisher, a writer, or other originator of the work. At block 82, the digital work is provided in a manner that the digital work is accessible to others. As noted earlier, the server system 10 may include a digital works database 22 with media files containing all forms of digital content, such as books, photographs, manuals, music, movies, etc. A directory of digital works in the digital works database 22 may be provided to the client systems 12, 14 and 28, 30 by the database manager 70 of the server system 10. Files containing the digital works may be requested, displayed, played back, or otherwise consumed by the client systems 12, 14 and 28, 30. Delivery of digital works to the client systems 12, 14 and 28, 30 may be accomplished in a variety of ways including, but not limited to, downloading the digital files, streaming the digital files from the server system 10, or providing access to the digital works at a computer-accessible source (e.g., by providing a URL to the digital work).

U.S. patent application Ser. No. 10/669,088, filed Sep. 23, 2003, which is commonly owned by the assignee of the present invention and incorporated by reference herein, discloses embodiments of systems that may be used in connection with embodiments of the present invention. Such systems may include one or more databases that include digital works in multiple representations. One representation of a digital work may include images of pages of content, while another representation of the digital work may include text searchable forms of the content. The content in the page images correlates with the text searchable form of the content. The page images may be stored in a page image database, while the searchable text may be stored in a text searchable database. Images of pages of content may be acquired using methods known in the art, such as scanning printed pages, converting electronic text to document images, retrieving page images from memory, receiving page images from others, etc.

For each image of a page of content, a recognition routine, such as an optical character recognition (OCR), may be performed on the page image to identify the text, position, and size of each word on the page and provide a text searchable representation of the page. A "word," in this context, may encompass any grouping of one or more characters, numbers, or symbols. Moreover, a word may stand alone or be associated with a non-text object, such as a picture or graphic. OCR routines are well known in the art of electronic document processing and do not require further discussion herein. The resulting text, position, and size information obtained from processing text on page images is may be stored in the text searchable database.

The text searchable database may be organized as desired, which may include using data structures optimized for full text searching. In one suitable embodiment, each word in the text searchable database has associated therewith content identification numbers for digital works (e.g., SKU numbers) and page numbers corresponding to the digital work and the images in the page image database where the particular word is found. Furthermore, the text searchable database typically includes information that identifies the position and size of the text (and possibly non-text objects associated with the text) as found on each respective page image. In one implementation, the position and size information is recorded as "quads," which include four numbers representing the X and Y position and the width and height of the text as it appears on a particular page image. All of this information may be encoded in the text searchable database to reduce the storage space required.

As will be described in more detail below, in some embodiments an annotation may be received in regard to particular content of a digital work. A text searchable database as discussed above can be used to enable an author of an annotation (or other person, entity or device) to indicate particular content in a digital work and associate an annotation with the particular content. As noted, the text searchable database may be constructed to include information that helps identify the image(s) in the page image database corresponding to the particular content. Thus, when an author of an annotation indicates particular content in a digital work by selecting text in the text searchable database, the selected text not only identifies the particular content that the author is annotating, but also identifies the corresponding page image(s) in the page image database where the particular content is represented. Word position and size information as discussed above may be helpful in this regard in that it correlates text in the text searchable database with the location of text as represented in a corresponding page image.

Supposing, for example, the author 34 (FIG. 1) desires to submit a comment on a digital work, provide updated or supplemental material, or otherwise annotate a digital work, the author 34 enters the annotations into the client system 30. The author 34 may enter the annotations into the client system 30 in a wide variety of formats depending on the software and hardware provided at the client system. In one format, for example, the author 34 may operate a keyboard to enter text annotations into the client system 30. In another format, the author 34 may enter graphical annotations, such as handwritten notes or drawings. The graphical annotations may appear in context with regard to the digital work being annotated, for example, in the margins, adjacent to, or superposed over or near particular content in a display of the digital work. Handwritten annotations may be particularly suited where the client system 30 is a tablet PC or PDA with a sensitive screen that readily accepts handwritten input. In another format, the author 34 may annotate the digital work by providing an image file containing an image pertaining to the digital work. When the server system 10 receives an annotation of a digital work from an author, such as author 34, the author may indicate one or more particular locations or content in the digital work to which the annotation pertains. In some implementations, the author 34 may be required to sign in or otherwise submit an identification before the author is allowed to submit annotations to the server system 10.

As indicated at block 84 in FIG. 3, the server system 10 may receive annotations of a digital work from an author. In a circumstance where author 34 is providing annotations to the client system 30, the client system 30 communicates the annotations to the server system 10 via the network 16. Annotations received by the server system 10 may be stored in the annotations database 24, in association with the digital work, as indicated at block 86. Storing an annotation in association with a digital work may be accomplished in any suitable manner, including simply storing the annotation in the annotations database 24 with an indication of the digital work to which the annotation pertains, and if apt, the particular content within the work to which the annotation pertains. Typically, the operator of the server system 10 has previously secured an agreement with the author concerning any copyright or other proprietary interest the author may claim in annotations submitted to the server system 10.

Embodiments of the present invention have a wide applicability of which the following examples are only a small part. The following examples give selected contexts for appreciating several advantages of the invention. An annotation, for example, may be a critique or alternatively a summary of the digital work. An annotation may be a separate essay on the same topic presented in the digital work. Annotations may be words, graphs, formulae, files, images, enhancements, etc., provided by the user. For example, a user may wish to annotate a travel book by providing recent images of locations described in the travel book. For digital works that are audio, such as music files, authors can annotate the music files with additional content commenting on the songs, providing background information on the singer or the recording process, alternative lyrics, technical information as to the composition, related musical compositions, etc. In a circumstance where the digital work is a cookbook, for example, authors may submit alternative ingredients that enhance a recipe, ingredients that make a spicier dish, ingredient substitutions considered to be lower in fat or carbohydrates, etc. In another circumstance, a student or teacher as an author may provide a markup of an academic textbook. As can be appreciated from the foregoing, there is virtually no limitation to the type, form and content of annotations that can be added to a digital work. By way of illustration, an annotation can also be in the form of a link or address to another page, file, or document available to the server system or the client system(s).

A user, such as the user 18 shown in FIG. 1, obtaining a digital work from the server system 10 may be notified by the server system 10 that annotations to the digital work are available. If desired, the server system 10 may present one or more summaries of the annotations or portions of the annotations to the user 18 for a preview.

As indicated at block 88 in FIG. 3, the server system 10 may receive a user request for an annotation of a digital work. This request typically identifies the digital work and possibly the particular annotation desired. Depending on implementation, distribution of annotations of digital works may be limited to users having an appropriate authorization credential that, when presented to the server system 10 and validated, enables the user to receive the requested annotation. Additional discussion of authorization credentials is provided below. As indicated at decision block 90, the method 80 determines whether the user has presented an authorization credential. If not, the method 80 terminates at block 92 by denying the user access to the requested annotation. If an authorization credential has been presented, the method 80 determines at decision block 94 whether the authorization credential is valid. If the authorization credential is not valid, the method 80 terminates at block 92 by denying the user access to the annotation. Otherwise, the annotation of the digital work is provided to the user at block 96. Delivery of an annotation to the user may be accomplished by downloading the annotation, streaming the annotation from the server system 10, or providing access to the annotation at a network source (e.g., by providing a URL to the annotation), possibly together with and perceptibly associated with some or all of the digital work to which the annotation pertains.

Authorization credentials presented by users may take any form appropriate for processing in the server system 10. For example, an authorization credential may be a token comprised of symbols or an alphanumeric code that is recognized in the server system 10. Users may obtain authorization credentials for accessing annotations in various ways. For example, a user purchasing a digital work may automatically receive an authorization credential to receive present and/or future annotations of the digital work without charge. Alternatively, a user may provide some form of compensation to the server system 10, such as a monetary payment or other item or representation of value. A user may also receive an authorization credential as an incentive for performing an action specified by the server system 10. For example, a user may receive an authorization credential for electronically previewing a digital work or purchasing one or more related digital works or annotations. Users may also receive authorization credentials for performing actions such as filling out surveys, participating in games, or providing annotations to digital works. In some circumstances, free access to annotations may be provided by simply giving the user an authorized credential when the user requests access to the annotation.

The server system 10 is configured to receive an authorization credential from a user requesting an annotation and determine whether the credential is valid, thus enabling the user to access the annotation. A user's authorization credential can be determined valid in any suitable manner, including comparing a user-submitted credential to a list of known credentials that have been authorized and distributed to users. Use of a credential may cause the credential to be removed from the list in this example, in cases where the credential is intended for a single use. Validation of an authorization credential may be separately communicated to the user or simply followed by delivery of the requested annotation to the user.

In other embodiments, an authorization credential may be generated and distributed for use with a specific annotation or group of annotations and as such, may be used only to authorize access to the specific annotation or group of annotations. Moreover, depending on the format of the authorization credential, the authorization credential may itself identify the annotation to which it pertains. In that case (where the authorization credential identifies the annotation), embodiments of the invention may be configured to receive the authorization credential and automatically consider it as a request for the annotation. A user may thus request an annotation and present the authorization credential in a single step.

Authorization credentials can be advantageously used to create a market for distribution of annotations to others. For example, where a user intends to submit monetary compensation for annotations, the user may be given a price list for annotations to a digital work. The user can then select which annotations the user desires to receive and pay for the annotations. In other embodiments, a subscription model may be used where the user pays a monthly or annual fee to have access to certain groups or all available annotations. Commercially-available payment processing systems may be used by an online marketplace 36 (FIG. 1) to receive a payment from the user for annotations.

Figure 4:
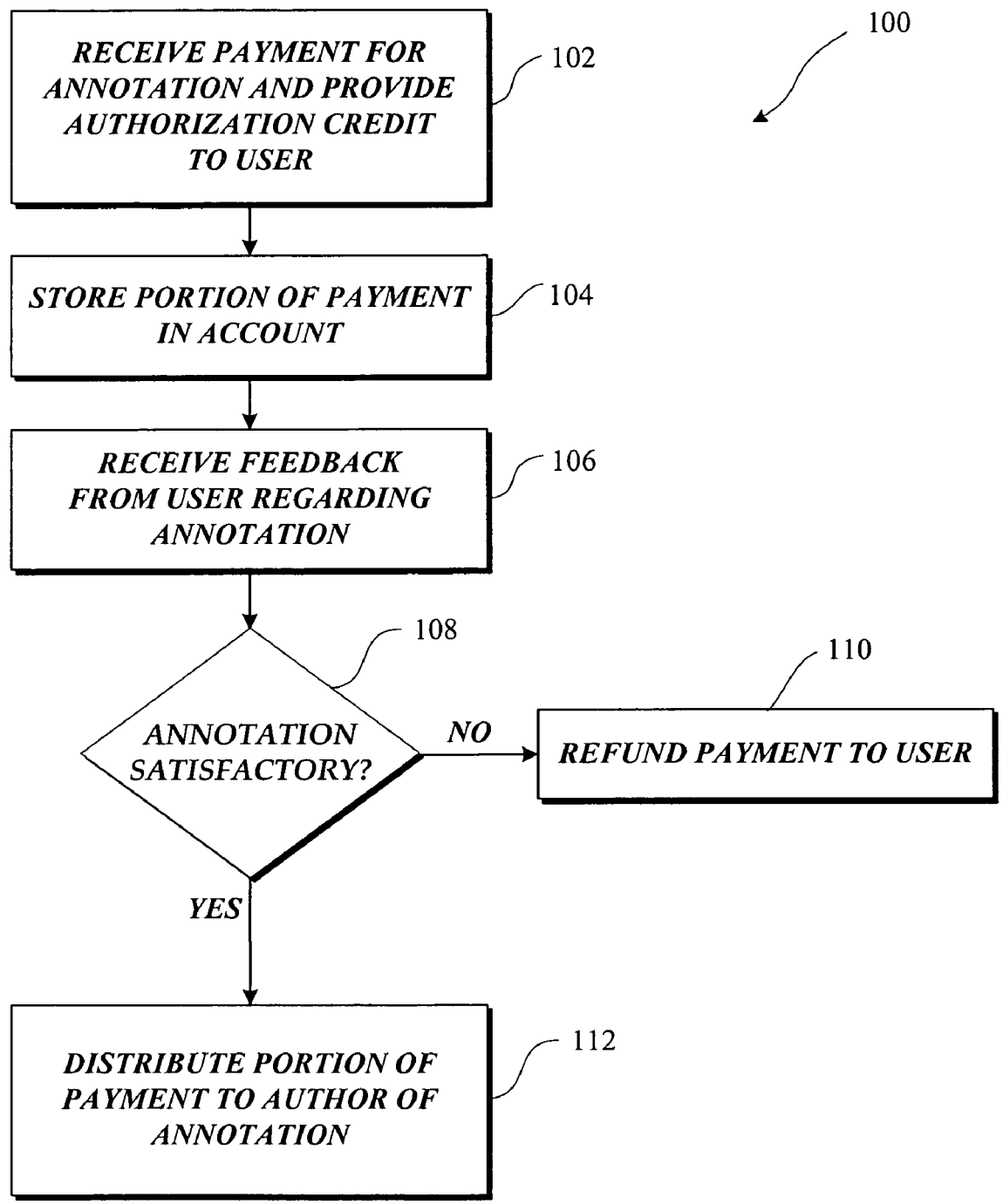
FIG. 4 is a flow diagram illustrating a payment and feedback aspect of the present invention.

Another aspect of creating a market for annotations of digital works is to provide incentive for users to submit annotations. FIG. 4 illustrates a flow diagram of a method 100 in which monetary compensation is paid for an annotation and some or all of such compensation is distributed to the author of the annotation. At block 102, the server system 10 receives a payment from a user for an annotation, records the transaction in the transaction information database 26, and provides the user an authorization credential to access the annotation. Compensation received from the user may be paid directly to the author of the annotation, or, as illustrated at block 104 in FIG. 4, some or all of the payment may be stored in a separate account by the transaction information database 26 for distribution to the author. Distribution of compensation to the author may be conditioned on the user's satisfaction with the annotation. At block 106, feedback regarding the annotation is received from the user. If, at decision block 108, the user's feedback indicates that the annotation was satisfactory, some or all of the payment stored at block 104 is distributed to the author of the annotation. If the annotation was not satisfactory to the user, the server system 10 may process a refund of the payment to the user, as indicated at block 110.

It should be noted that "authors" and "users" can be, and typically are, distinct from the persons, entities, or devices that are the creators, originators, producers, publishers, distributors, or other "sources" of digital works to be annotated. To further illustrate distinctions between "authors", "users", and "sources", consider a person A who writes a book that publisher P publishes in hardbound, paperback, audio (e.g., "books on tape"), and/or digital forms (e.g., electronic books that can be viewed using a suitable device incorporating a visual display), these forms of the book being distributed to the public, for example, through retail outlets such as book stores, book clubs, and online marketplaces accessible via computer networks. As to the last, publisher P may authorize the limited reproduction of all or selected portions of the book by such online marketplaces for promotional purposes.

Now consider a person B who wishes to write a review of the book, as for a newspaper, magazine, online journal, or even for one of the online marketplaces that offers the book for sale. In accordance with suitable embodiments of the invention, person B's review can be (or can become) an annotation to A's book, given proper authorization(s) by A, P, and/or B for this to occur, and can be bought, sold, traded, rented, etc., at the same online marketplace as A's book and/or at other online marketplaces or retail establishments. B's review need not be limited to a conventional self-contained review essay that is written to be read separately from A's book. Instead (or additionally), in accordance with embodiments of the invention, B may write some or all of the book review as a set of annotations that pertain to, and are fully understandable when read in context with, specific sections or passages of the book.

For example, B's review may focus on textual passages or pictures or diagrams in A's book that, to B's sensibilities, seem particularly noteworthy, and link or associate these with corresponding portions of the review. In other words, B annotates the passages or images, and the annotations, taken together, make up some or all of B's book review.

With A's original work and B's review now available, it becomes possible for another person C to annotate both A's book and B's review thereof, as digital works. A and/or B may, if they choose, respond to C's comments and to one another, with all these comments and responses being added as yet further annotations to A's book, suitably limited to or associated with pertinent passages and/or prior annotations, as appropriate, that are read in context with the pertinent sections or passages of the book.

The entire set of annotations or subsets thereof (e.g., only C's annotations, or only A's responses, or only annotations made at the behest of publisher P) can be made available with appropriate authorizations from A, B, C, and P, as may be necessary (or, in some instances, under the doctrine of fair use or other legal rubric without prior authorization) for purchase, rental, exchange, or other use by a consumer D. Thus, A and P may be considered "sources" in this example; B, C and A (in the role of responding to B's and C's annotations) may be considered "authors"; and D may be considered a "user". Further, a particular online marketplace M (or other forum in which annotations and annotated digital works according to the invention are made available to "users") may be considered none of these, although it will be appreciated that in some situations where publisher P owns marketplace M or vice versa, or where A self-publishes a book through M without the assistance of a conventional publisher P, M may be viewed as a "source".

As will be described below in reference to FIGS. 5-9, annotations of a digital work may be viewable concurrent with or separate from a display of the digital work. Annotations may be received in graphical form, including handwriting. Annotations may also include highlighting of text in the digital work. In some circumstances where annotations are associated with particular content in the digital work, the annotations may be presented in a manner such that the annotations are normally hidden and become viewable only when a user positions a cursor or pointer near the particular content in the digital work. Techniques for recognizing the position of a cursor or pointer within a digital work displayed on a screen are known in the art.

Furthermore, indicators may be included in the digital work to identify particular content having annotations. In a textual digital work for example, the indicators may appear as footnotes, graphical icons, symbols, characters, or other indicia that are located with the text. Where the digital work is an audio work or an audiovisual work, an annotation associated with particular content in the digital work may be identified by an indicator in a playback control provided for playback of the digital work. In yet another alternative, a digital work having annotations pertaining to particular content in the digital work may provide a listing of contents for the digital work with indicators in the listing of contents identifying the location of the annotations.

Figure 5:
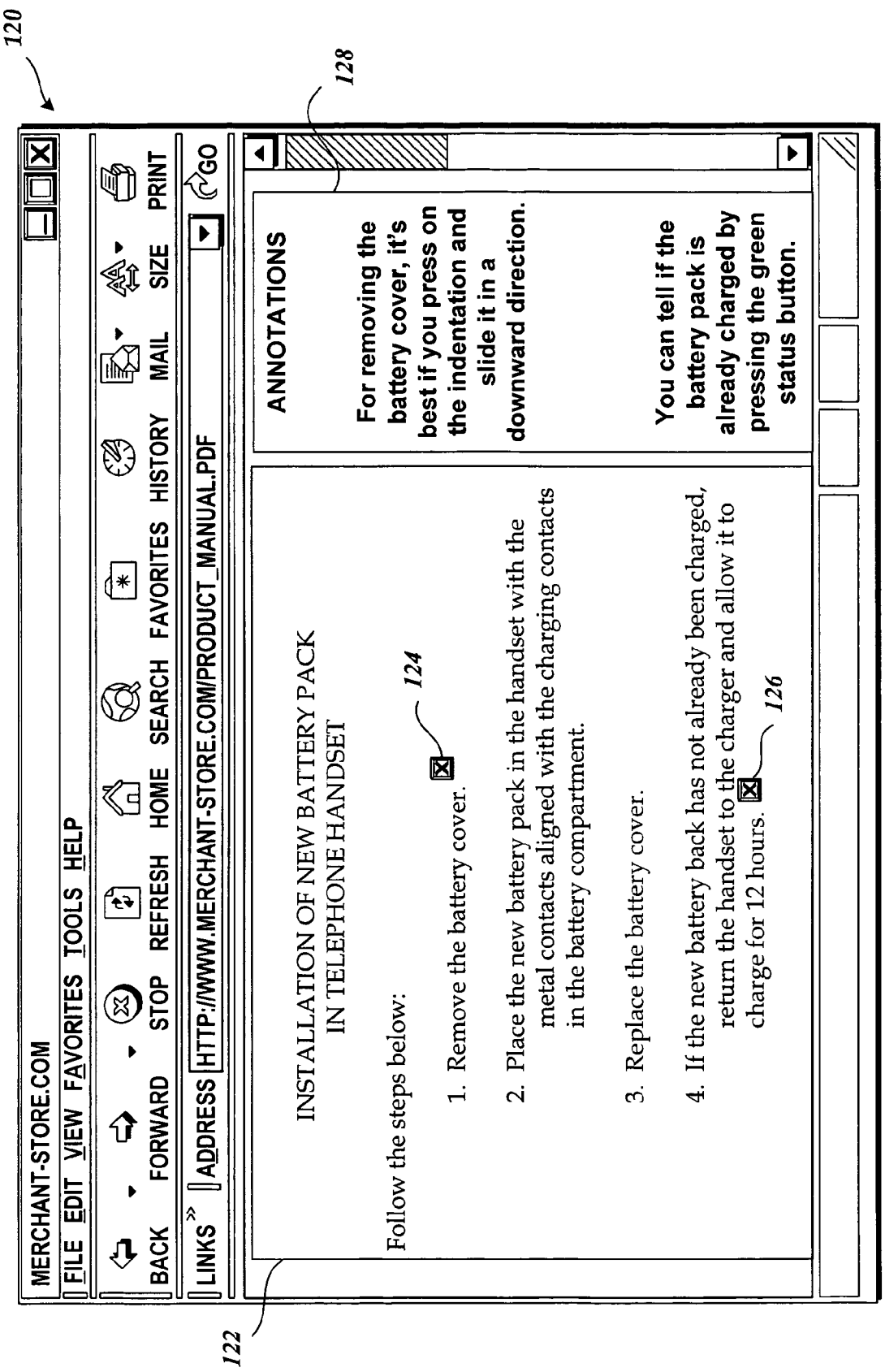
FIG. 5 is a pictorial diagram of an exemplary Web page formed in accordance with an embodiment of the present invention presenting a digital work and annotations in textual format.

Turning now to the example given in FIG. 5, a browser program 120 may be used to depict a Web page to a user. In the embodiment shown in FIG. 5, the Web page includes a display of a digital work 122, here comprising a manual for a cordless telephone. The digital work 122 shown provides instructions for installation of a new battery back in a telephone handset. The digital work, in this example, is textual in form.

Displayed with the digital work 122 are indicators 124, 126 indicating the presence of annotations to the digital work. The indicators 124, 126 may be graphical icons, characters, or symbols that are simply displayed with the digital work. Alternatively, the indicators 124, 126 may provide active links that initiate the display of corresponding annotations when a user activates (e.g., checks or clicks on or hovers over) the indicators 124, 126.

The Web page illustrated in FIG. 5 further includes a section 128 for displaying annotations of the digital work 122. In some embodiments, the annotations 128 may be displayed in a frame that is separate from a frame in which the digital work 122 is displayed. Activating the indicators 124 and 126 in the display of the digital work may cause the annotations section 128 to appear. The particular annotation associated with the indicator 124, 126 that the user has activated may appear highlighted, if desired. Annotations may also be associated with the indicators 124, 126 by use of a suitable numbering system where numbers in the indicators 124, 126 correspond to numbers (not shown) associated with each of the annotations.

Figure 6:
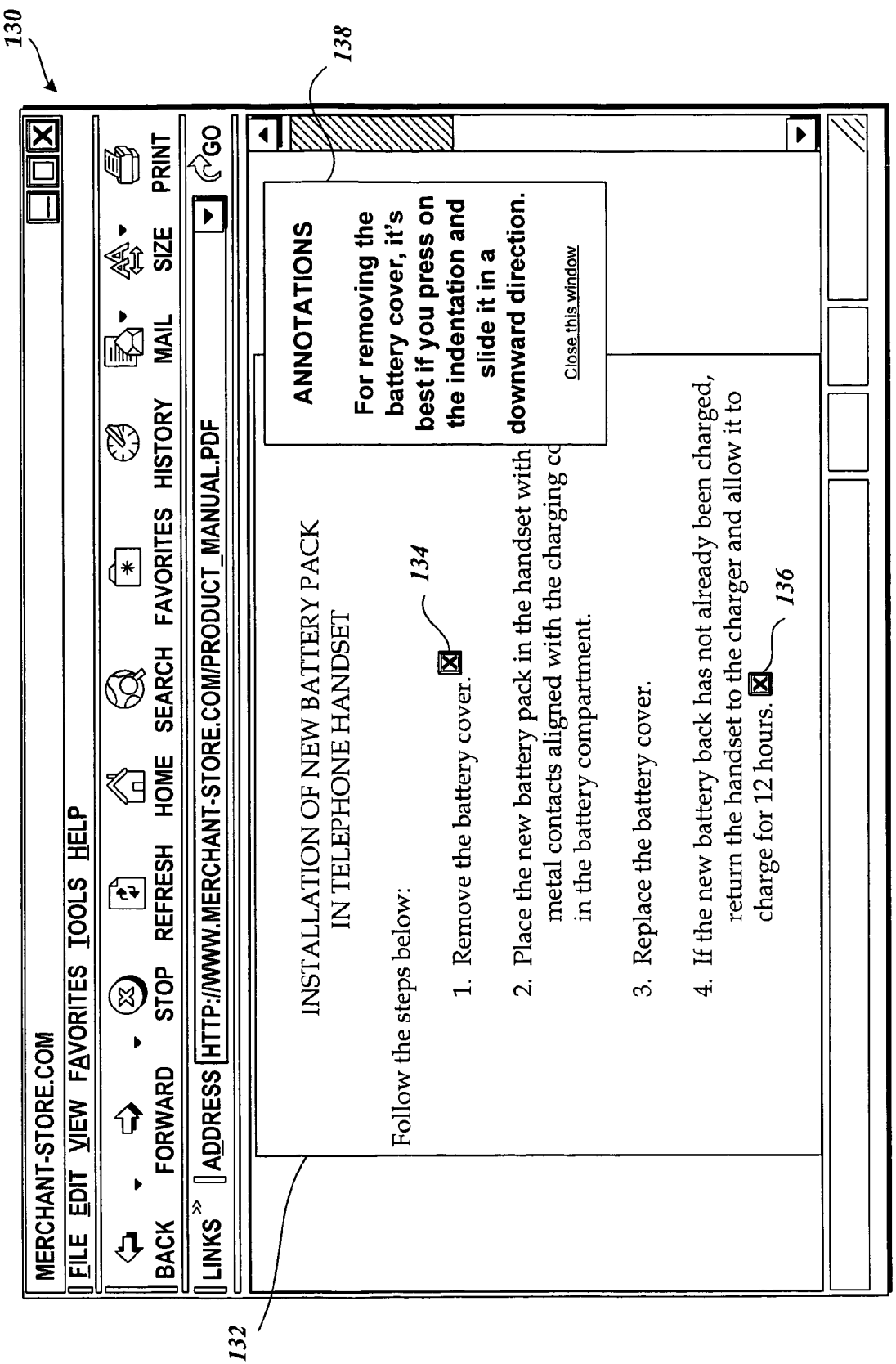
FIG. 6 is a pictorial diagram of an exemplary Web page formed in accordance with another embodiment of the present invention presenting textual annotations in a separate window.

FIG. 6 is a pictorial diagram of a Web browser 130 providing another exemplary Web page formed in accordance with an embodiment of the present invention. In this embodiment, textual annotations 138 are presented, but in a separate window that may appear superposed on the display of the digital work 132. This embodiment is particularly suited to environments where the user may activate indicators 134 and 136 to cause the annotations window 138 to appear. Typically, the annotations window 138 provides a way for the user to close the window so the user may continue to read the text of the digital work 132, if any, hidden behind the annotations window 138. Standard windowing technology may also be used to permit the user to resize or move the annotations window 138 within the display of the Web browser 130.

Figure 7:
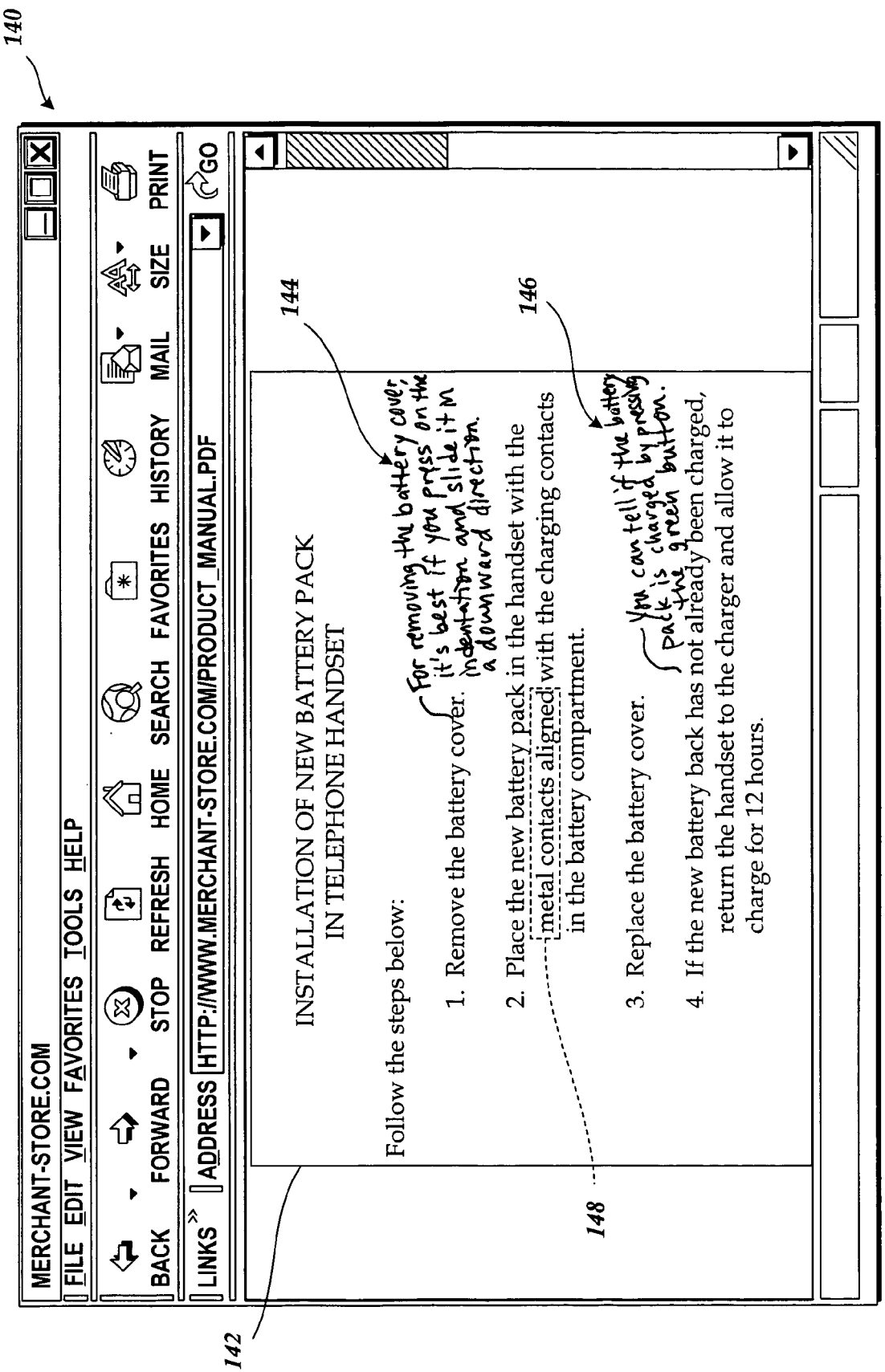
FIG. 7 is a pictorial diagram of an exemplary Web page formed in accordance with yet another embodiment of the present invention presenting graphical handwritten annotations superposed on a textual digital work.

In yet another embodiment of the invention, a Web browser 140 as shown in FIG. 7 may provide a Web page display of a digital work 142 in which annotations 144 and 146 are presented in a graphical, handwritten format. The handwritten annotations 144 and 146 may be displayed just as they are received from the author of the annotations. Of course, such annotations can include graphical drawings as well as handwriting. An annotation may also be provided in the form of a color or bold highlight 148 that is displayed with the text of the digital work 142. As shown in FIG. 7, the annotations 144, 146, 148 may be configured to appear to a user superposed on an image of the digital work.

Figure 8:
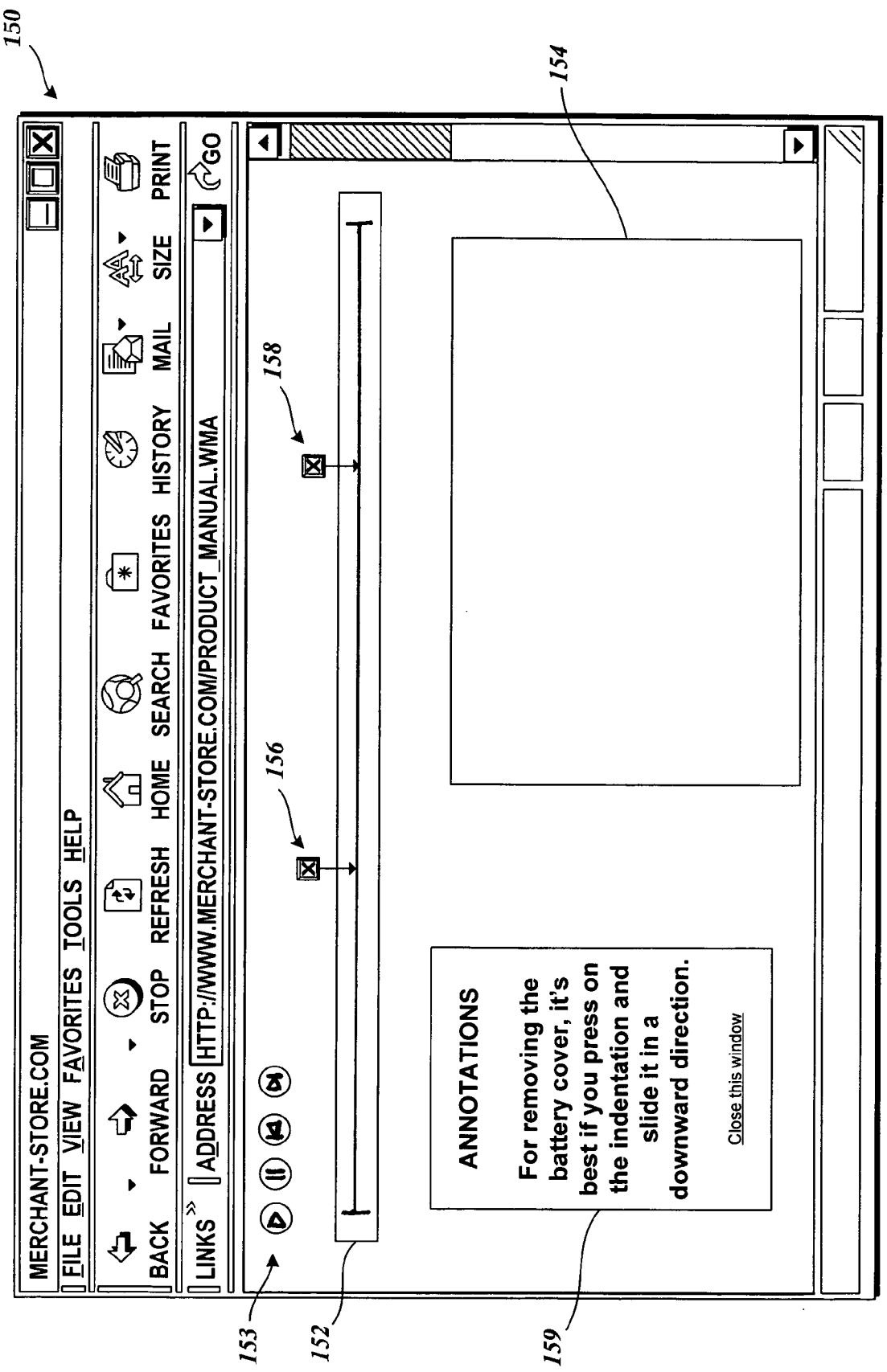
FIG. 8 is a pictorial diagram of an exemplary Web page formed in accordance with still another embodiment of the present invention presenting a digital work and/or annotations in an audio or audiovisual format.

Digital works and/or annotations may also be received from authors and presented to users in an audio or audiovisual form, as illustrated in FIG. 8. FIG. 8 depicts a Web browser 150 with a Web page that includes a playback control 152. The playback control 152 provides a graphical depiction of an audio or audiovisual file and typically represents the duration of the audio or audiovisual file. Additional playback controls 153 may be provided to control the playback of the file. Where the digital work is an audiovisual work, the visual portion of the digital work may be displayed in a section 154 of the Web page.

Annotations to the audio or audiovisual work may be indicated by indicators 156 and 158, for example, associated with the playback control 152. In the embodiment shown in FIG. 8, the annotations 156 and 158 are associated with particular content in the digital work. For instance, where the digital work is an audio recording of the installation manual shown in FIGS. 5-7, the annotations may be associated with particular steps in the installation as they occur in the audio recording. Activating the indicator 156, for example, may cause a window 159 to appear with a textual annotation associated with the particular installation step being described in the audio playback.

Alternatively, a digital work may be presented in textual form with annotations in an audio or audiovisual format. Activating an indicator in the display of the digital work may cause a playback control 152 and controls 153 to appear for operating the playback of the annotation to the digital work. If the annotation of a digital work is an image, activating the annotation indicator in the digital work may cause a window, such as window 154, to appear with the image annotation. As should be appreciated from the foregoing, the presentation and format of annotations of digital works is not limited.

Figure 9:
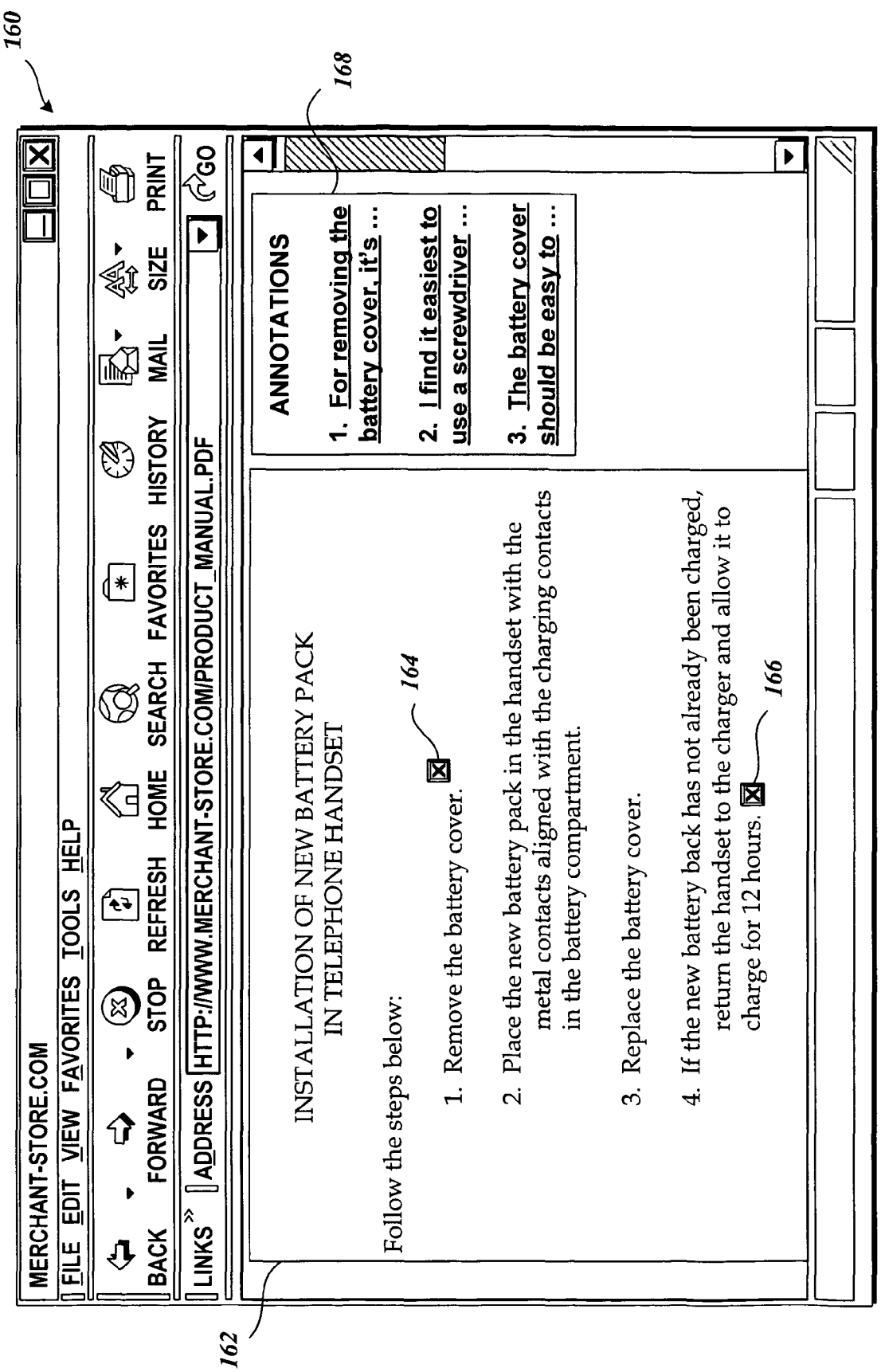
FIG. 9 is a pictorial diagram of an exemplary Web page formed in accordance with another embodiment of the present invention presenting a digital work and annotations in a textual format, with the annotations presented to a user in a list.

FIG. 9 illustrates yet another embodiment of the present invention in which multiple annotations for the same content in a digital work are presented to the user in a form of a list. The Web browser 160 in FIG. 9 is shown displaying a Web page with a digital work 162 in textual form. Indicators 164 and 166 in the digital work 162 indicate the presence of one or more annotations. Should a user activate the indicator 164, for example, an annotations window 168 may appear providing a list of annotations to the user. The annotations in the list may be presented to the user in an order determined by reference to a criterion. For example, one criterion may be a ranking of the annotations assigned by others who previously have viewed and "voted" on the quality of the annotations. Those annotations having a higher ranking may be presented first. In circumstances where annotations are provided to users in exchange for monetary compensation, the users are more likely to select those annotations previously deemed to be of higher quality.

Another criterion for ordering a list of annotations is the price assigned to each of the annotations. A user may choose to have the lowest priced annotations or the highest priced annotations listed first. Yet another criterion for determining the order of annotations is the date of receipt of each of the annotations. For example, annotations that are more recent may be presented above annotations that are older. Other suitable criteria can be readily recognized by persons having ordinary skill in the art.

In some circumstances, user receipt of annotations may be conditioned on prior purchase of the digital work to which the annotations pertain. Conditioning the receipt of annotations on the purchase of the underlying digital work provides incentive to users to purchase the work. Moreover, authors of underlying digital works are more likely to grant permission to users to add annotations to the digital work, where such permissions are necessary. A user's purchase of the underlying digital work may be recorded by the transaction manager 72 in the transaction information database 26 and later referenced when the user requests the annotations to the digital work.

Also as noted earlier, authors submitting annotations may indicate particular content in the digital work to which the annotations pertain. Where the digital work is, for example, a book, annotations may pertain to the whole work or particular portions of the work, for example, a chapter, certain pages, or certain text on a page.

Further embodiments of the invention may allow users to receive authorization credentials to access annotations from one or more authorized distributors of credentials. For example, an entity providing only annotations to digital works may have a relationship with an online retailer that permits the online retailer to give authorization credentials to purchasers of digital works, which authorization credentials are valid for use in accessing annotations of the purchased works from the entity. In another circumstance, the author of an annotation may become an authorized distributor and distribute authorization credentials to others, allowing them to access the particular author's annotations. Distribution of access credentials in this manner may be advantageous where an author wishes to provide access to his or her annotations to selected family, friends, etc. For example, a group of students in a class or book club may each annotate a digital work and share their annotations with the others in their group by appropriate distribution of authorization credentials among the group. In yet another environment, a publisher may be an authorized distributor that distributes valid credentials for accessing annotations to works published by the publisher.

In still further embodiments of the invention, a computer-implemented method may be provided which includes obtaining a first representation of a digital work, the first representation comprising one or more images. A second representation of the digital work is obtained, the second representation comprising content of the digital work in a form that allows particular content of the digital work to be indicated. The particular content is correlatable with one or more locations in the one or more images at which the content is represented. The method further includes receiving an annotation of the digital work in regard to indicated particular content of the digital work, and providing to a user the annotation in context with regard to the digital work. In regard to the latter, one or more images of the digital work may be provided to the user such that the annotation is perceptibly associated by the user with the particular content in the digital work. For example, the annotation may be configured to appear to the user superposed on one or more of the images of the digital work. Alternatively, the annotation may be configured to appear adjacent to one or more of the images of the digital work. The one or more images may further include an indication of the particular content to which the annotation pertains. The indication of particular content to which the annotation pertains is typically received from the author of the annotation, though it may be received from others.

As previously noted, the annotation may be received from an author that is different than the source of the digital work. Likewise, the user to whom the annotation is provided may be different than the source of the digital work. It should be recognized that an annotation of a digital work may be further subject to annotation by another author.

In some embodiments, the annotation may be provided to the user via an online marketplace. If desired, the annotation may be provided to the user together with the digital work via the online marketplace.

While several exemplary embodiments of the invention have been illustrated and described above, it will be appreciated that various changes can be made therein without departing from the spirit and scope of the invention. The scope of the invention, therefore, should be determined from the following claims and equivalents thereto.

What is claimed is:

1. A computer-implemented method for providing an annotation of a digital work, comprising:
   under control of instructions that are executed by one or more computing devices:
   receiving multiple annotations from different authors for particular content in a digital work;
   storing the annotations in association with the digital work;
   providing a list of abbreviated versions of the annotations to a user desiring to access one or more of the annotations, wherein the list presents the annotations in an order determined by reference to a criterion;
   receiving an authorization credential from a user desiring to access one or more of the annotations; and
   if the authorization credential is valid, providing a full version of one or more of the annotations of the digital work to the user in context with regard to the digital work.

2. The method of claim 1, wherein an annotation of the digital work is received in a graphical format.

3. The method of claim 2, wherein the annotation of the digital work is received in handwriting format.

4. The method of claim 1, wherein an annotation includes highlighting of text in the digital work.

5. The method of claim 1, wherein an annotation is provided such that the annotation is viewable by the user concurrent with a display of the digital work.

6. The method of claim 1, wherein an annotation is provided such that the annotation is normally hidden and becomes viewable when a cursor or pointer is positioned near the particular content in the digital work.

7. The method of claim 1, wherein the digital work is textual and the particular content in the digital work is identified by an indicator displayed near the text of the digital work.

8. The method of claim 1, wherein the digital work is an audio or audiovisual work and the particular content in the digital work is identified by an indicator displayed with a playback control provided for playback of the digital work.

9. The method of claim 1, wherein the particular content in the digital work is identified by an indicator displayed with a listing of contents for the digital work.

10. The method of claim 1, wherein an annotation includes an image.

11. The method of claim 1, wherein the user has obtained the authorization credential in exchange for compensation paid by the user, the method further comprising distributing compensation to the author of an annotation.

12. The method of claim 11, wherein compensation is distributed to the author after receiving an indication of satisfaction from the user to whom the annotation is provided.

13. The method of claim 1, wherein the authorization credential is specific to an annotation desired by the user.

14. The method of claim 1, wherein the criterion is a ranking of the annotations assigned by others who previously have viewed the annotations.

15. The method of claim 1, wherein the criterion is a price assigned to each of the annotations.

16. The method of claim 1, wherein the criterion is a date of receipt of each of the annotations.

17. The method of claim 1, wherein an annotation, when combined with the digital work to which it pertains, becomes accessible upon accessing the digital work.

18. The method of claim 1, wherein the user has obtained the authorization credential in exchange for purchase of the digital work to which an annotation pertains.

19. The method of claim 1, wherein the user has obtained the authorization credential in exchange for user-performance of a specified action.

20. The method of claim 19, wherein the specified action is electronically previewing a digital work.

21. The method of claim 19, wherein the specified action is contributing an annotation of a digital work.

22. The method of claim 1, further comprising submitting the authorization credential to a validation system that generates an indication of the credential's validity.

23. A non-transitory computer-readable medium having stored thereon computer-executable instructions that, in response to execution by a computing system, cause the computing system to:
    receive from a client system an annotation of a digital work by a first user;
    store the annotation in a memory in association with the digital work;
    require a second user desiring to access the annotation of the first user to perform a specified action before providing an authorization credential to the second user, wherein the specified action is contributing an annotation of a digital work; and
    upon receipt of the authorization credential from the second user desiring to access the annotation, provide the annotation to a client system for output to the second user, wherein the annotation is provided in context with regard to the digital work.

24. The computer-readable medium of claim 23, further configured with program instructions that direct the computing system to receive the annotation in a graphical format.

25. The computer-readable medium of claim 23, further having stored thereon computer-executable instructions that direct the computing system to receive the annotation in a textual format.

26. The computer-readable medium of claim 23, further having stored thereon computer-executable instructions that direct the computing system to store the annotation in association with particular content in the digital work.

27. The computer-readable medium of claim 23, further having stored thereon computer-executable instructions that direct the computing system to receive the annotation in the form of an image.

28. The computer-readable medium of claim 23, further having stored thereon computer-executable instructions that direct the computing system to facilitate a payment of compensation from the user for access to the annotation and distribute compensation to the author of the annotation.

29. The computer-readable medium of claim 28, further having stored thereon computer-executable instructions that direct the computing system to distribute compensation to the author after receiving an indication of satisfaction from the user to whom the annotation is provided.

30. The computer-readable medium of claim 23, wherein the authorization credential is specific to the annotation provided to the user.

31. The computer-readable medium of claim 23, further having stored thereon computer-executable instructions that direct the computing system to provide the annotation to the user only after the user has purchased the digital work to which the annotation pertains.

32. The computer-readable medium of claim 23, wherein the specified action is electronically previewing a digital work.

33. A computer-implemented method for providing an annotation of a digital work, comprising:
    under control of instructions that are executed by one or more computing devices:
        obtaining a first representation of a digital work, the first representation comprising one or more images;
        obtaining a second representation of the digital work, the second representation comprising content of the digital work in a form that allows particular content of the digital work to be indicated, the particular content being correlatable with one or more locations in the one or more images at which the particular content is represented;
        receiving an annotation of the digital work in regard to indicated particular content of the digital work; and
        providing to a user the annotation in context with regard to the digital work.

34. The method of claim 33, further comprising providing one or more images of the digital work to the user such that the annotation provided to the user is perceptibly associated by the user with the particular content in the digital work.

35. The method of claim 34, wherein the annotation is configured to appear to the user superposed on one or more of the images of the digital work.

36. The method of claim 34, wherein the annotation is configured to appear adjacent to one or more of the images of the digital work.

37. The method of claim 36, wherein the images further include an indication of the particular content to which the annotation pertains.

38. The method of claim 33, wherein the digital work originates from a source and wherein the author of the annotation and the source of the digital work are different.

39. The method of claim 33, wherein the digital work originates from a source and wherein the user to whom the annotation is provided and the source of the digital work are different.

40. The method of claim 33, wherein the annotation is provided to the user via an online marketplace.

41. The method of claim 40, wherein the annotation is provided to the user together with the digital work via the online marketplace.

42. The method of claim 33, wherein an annotation of the digital work is further subject to annotation by another author.

43. The method of claim 33, wherein the indication of particular content of the digital work to which the annotation pertains is received from an author of the annotation.

44. A computing system programmed to provide a marketplace for annotations of digital works, comprising:
    a computing subsystem that receives digital works from a plurality of sources;

a computing subsystem that receives annotations of digital works from a plurality of authors;

a computing subsystem that receives requests for annotations from a plurality of users and delivers annotations to requesting users; and a computing subsystem that facilitates receiving compensation from users for delivery of annotations and distributing compensation to authors of the delivered annotations, wherein the compensation distributed to an author is conditioned on an indication of satisfaction from the user to whom the annotation was delivered.

45. The computing system of claim 44, wherein the compensation distributed to an author is a portion of the compensation received from a user.

46. The computing system of claim 44, wherein the compensation received from a user is represented by a valid authorization credential received from the user.

47. The computing system of claim 44, wherein the compensation received from a user is performance by the user of a specified action.

48. The computing system of claim 44, wherein the compensation received from a user is included in compensation paid by the user to access a digital work.

49. A non-transitory computer-readable medium having stored thereon computer-executable instructions that, in response to execution by a computing system, cause the computing system to:

receive multiple annotations from different authors for particular content in a digital work;

store the annotations in association with the digital work;

provide a list of abbreviated versions of the annotations to a user desiring to access one or more of the annotations, wherein the list presents the annotations in an order determined by reference to a criterion;

receive an authorization credential from the user desiring to access one or more of the annotations; and if the authorization credential is valid, provide a full version of the one or more annotations of the digital work to the user in context with regard to the digital work.

50. The computer-readable medium of claim 49, wherein the criterion is a ranking of the annotations assigned by others who previously have viewed the annotations.

51. The computer-readable medium of claim 49, wherein the criterion is a price assigned to each of the annotations.

52. The computer-readable medium of claim 49, wherein the criterion is a date of receipt of each of the annotations.

* * * * *